June 5, 1951  C. S. FRANCIS, JR  2,556,078
TRANSFER AND METHOD OF COATING THEREWITH
Filed May 18, 1945
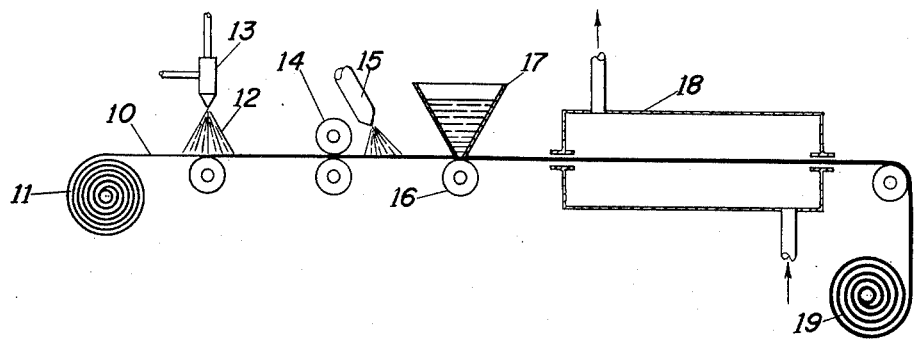
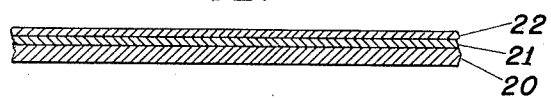
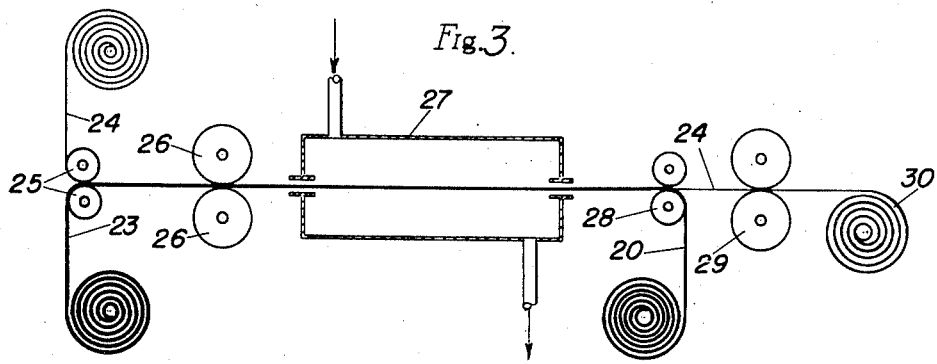
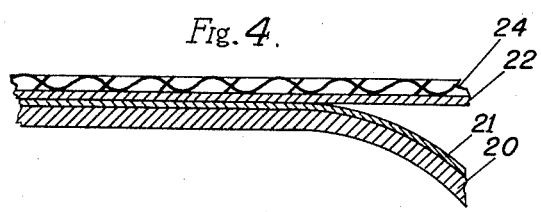
INVENTOR
CARLETON S. FRANCES, Jr.
BY Worth Wade
ATTORNEY Patented June 5, 1951

2,556,078

UNITED STATES PATENT OFFICE 2,556,078

TRANSFER AND METHOD OF COATING THEREWITH

Carleton S. Francis, Jr., West Harwich, Mass., assignor, by mesne assignments, to American Viscose Corporation, Wilmington, Del., a corporation of Delaware Application May 18, 1945, Serial No. 594,580

5 Claims. (Cl. 154—95)

The present invention relates to thermoplastic transfers and, in particular, to the backing sheets used as a temporary support for thermoplastic transfer films and to correlated improvements designed to enhance the structure, improve the properties, and extend the uses of such transfers.

In United States Patent No. 2,253,717 of Carleton S. Francis, Jr. and Worth Wade, there is disclosed a transfer comprising a thermoplastic film temporarily supported on a backing sheet, to which the film shows no tendency for permanent adhesion and from which it can be transferred by heat and pressure to another surface. In the production of such transfer films, the temporary backing sheet must have a number of correlated characteristics for efficient use.

1. The backing sheet must show sufficient adhesion to the transfer film to adequately support the film during shipping and handling incident to use.

2. However, the backing sheet must be of such character that the transfer film can be stripped from the backing sheet after the application of heat and pressure without delamination or rupture of the film.

3. The backing sheet should preferably be of such character that it is capable of reuse, or adapted to be used as a wrapping and packaging material after the stripping of the transfer film therefrom.

4. The backing sheet should have a smooth surface and impart to the transfer film a smooth and, in some cases, a glossy surface.

5. When the backing sheet is a coated material, the coating must not dry out, crack, or mold and must remain flexible under all conditions of shipping, storage, and use.

It is apparent that the problem of applying backing sheets which will meet all of these stringent requirements is extremely difficult.

In the prior art use has been made of temporary backing sheets in the form of highly calendered paper, metal drums, other hard materials. It has been found that the use of such hard backing sheets is disadvantageous when transferring extremely thin thermoplastic films or when transferring thermoplastic films to delicate fabrics, thin paper, and the like. When the surface to be coated is rough and irregular and a hard backing sheet is employed, the transfer film is squeezed between the surface being coated and the backing sheet resulting, in some cases, in a distortion of the transfer film and even in its rupture. It is not practical to avoid rupture or distortion by decreasing the pressure and increasing the temperature of application of the film to the surface since the film is thermoplastic and hence rendered more susceptible to distortion at higher temperatures.

Accordingly, it is an object of the present invention to provide a temporary backing sheet for thermoplastic transfer films which will be free of the disadvantages of prior backing sheets and permit the rapid transfer of the film therefrom by the application of heat and pressure without delamination.

It is a specific object to provide a backing sheet having a permanent, nontransferable coating thereon which will meet all of the requirements above specified.

It is another object of the invention to provide a process for forming backing sheets for thermoplastic transfer films.

A further object of the invention is to provide a transfer comprising a thermoplastic film supported upon a coated backing sheet, the coating being of such character as to properly support the film prior to use while readily releasing the film after transfer without delamination.

Other objects of the invention will in part be obvious and will in part appear hereinafter.

According to the present invention, there is provided a composite transfer sheet comprising a thermoplastic transfer film temporarily supported on a coated backing sheet, the coating on the backing sheet having a thermal softening point higher than the thermal tacking point of the transfer film, said coating adhering permanently to the backing sheet and being hydrophobic and water insoluble. It is to be understood that the intermediate coating is nontransferable and that it extends over the entire area of the backing sheet, thus preventing contact of the backing sheet direct with the thermoplastic transfer film. In the now preferred embodiment, the intermediate nontransferable coating comprises a thermosetting film-forming resin composition in the nonthermoplastic insoluble stage.

In all embodiments the transfer film and the thermoset coating upon the backing film exhibit no tendency for permanent adhesion to each other. In general, this result can be attained by forming the films of materials of the same or dissimilar chemical nature but having dissimilar physical properties, in particular, a difference in thermal characteristics which permits the transfer film to be rendered tacky while the coating remains nontacky.

Thus, there is employed as the coating any thermosetting organic material which is preferably flexible and does not become tacky under the temperature and pressure used in the transfer operation. Ordinarily, the coated backing sheet will have a thickness several times the thickness of the transfer film, it being understood that after the transfer operation, the coated backing sheet is stripped from the transfer film, the film adhering to the surface which has been coated and the coating upon the backing sheet adhering to the backing sheet without delamination therefrom. The coated backing sheet may be recoated with a transfer film composition for repeated use. If necessary, the backing sheet may be calendered to restore its smooth surface before being recoated.

In use, the composite transfer sheet is applied with the transfer film face down on the surface to be coated. Heat and pressure are then preferably applied to cause the transfer film to become tacky and adhere to the surface. Thereafter, or simultaneously therewith, the coated backing sheet is stripped from the transfer film preferably after cooling the laminate so that the transfer film is in a nontacky condition. The cooling step is not essential, however, if the transfer film is formed of a thermosetting composition which has been rendered nonthermoplastic prior to the stripping operation.

In the following specification and in the appended claims, the term "thermoplastic transfer film" is intended to designate that film which is transferred from the temporary backing to another surface. The expression "backing sheet" is intended to designate the temporary support for the transfer film, and the expression "nontransferable coating" is intended to designate the coating on the backing sheet, upon which the transfer film is temporarily supported.

For a more complete understanding of the nature and objects of the invention, reference should be had to the accompanying drawing in which:

Figure 1 is a side elevation partly in section of one embodiment of suitable means for forming the transfer sheeting of the present invention;

Figure 2 is a cross section of one embodiment of the transfer sheeting;

Figure 3 is a side elevation partly in section of one embodiment of suitable means for coating a sheet material by use of the composite transfer sheeting; and Figure 4 is a cross section of the assembled materials at the point of stripping of the coated backing sheet from the transfer film.

The coated backing sheet

The backing sheet may be formed of any fibrous or nonfibrous organic sheet materials. Among the fibrous materials there may be employed paper, fabrics, and felts formed of natural or synthetic fibres or mixtures thereof, and among the nonfibrous sheet materials, there may be employed hydrophilic organic plastic films such, for example, as regenerated cellulose, gelatine, casein, deacetylated chitin, zein, alkali-soluble water-insoluble cellulose ethers, and the like, also hydrophobic organic plastic films such, for example, as thermoplastic cellulose derivatives as a class, thermoplastic resins as a class and films formed from mixtures of these classes, synthetic rubber, and the like.

It will be obvious that when a thermoplastic material is used as the backing sheet that there is selected a material which has a thermal softening point higher than the thermal tacking point of the transfer film.

The nontransferable intermediate coating

In accordance with the invention, the fibrous and nonfibrous backing sheet is first treated to provide on one or both sides a smooth nontransferable coating. This coating must have a thermal softening point above the thermal tacking point in the transfer film employed. In a preferred embodiment of the invention the transfer film has a thermal tacking point of from about 90° C. to 160° C. Hence, the film-forming organic material which is employed in preparing the coating upon the backing sheet should have a thermal softening point above about 160° C. but, in general, between about 100° C. and about 300° C. Both thermoplastic and thermosetting resins may be employed for the nontransferable coating. Likewise, mixtures of thermoplastic and thermosetting resins have been found suitable. Among the materials which have been employed are:

Thermoplastic resins polyvinyl chloride
polyvinylidene chloride
polystyrene
copolymers of vinyl chloride and vinyl acetate
copolymers of methyl methacrylate and vinyl chloride
polyvinyl butyral
polyvinyl acetal
polymethyl methacrylate
polymethyl acrylate
polyethylene
polyamides
natural rubbers
synthetic rubbers:
    chlorinated rubber
    polysulfides
    polyisobutylenes
    poly chloroprene
    cyclized rubber
    rubber hydrochloride
    Buna rubber
cycloparaffins
chlorinated naphthalenes
chlorinated paraffins
coumarone-indene
oil-modified and unmodified alkyd resins prepared from dihydroxy alcohols and dicarboxylic acids
phenol-formaldehyde resins prepared from phenols having only two reactive positions

Thermoplastic cellulose compounds cellulose acetate
cellulose acetate butyrate
cellulose acetate propionate
cellulose propionate
benzyl cellulose
ethyl cellulose
butyl cellulose
hydroxy ethyl cellulose

Thermosetting resins urea-formaldehyde
phenol-formaldehyde (phenols having three reactive positions)
melamine-formaldehyde
alkyd resins prepared from polyhydric alcohols and polycarboxylic acids
phenol-furfural unsaturated polyesters polyallyl alcohol and derivatives protein-formaldehyde resins:
  casein-formaldehyde
  shellac-formaldehyde

*Mixtures of thermoplastic and thermosetting resins* polyvinyl chloride and urea-formaldehyde-butanol ether
polyvinyl chloride and phenol-formaldehyde
polymethyl methacrylate and urea-formaldehyde
polystyrene and alkyd
coumarone-indene and alkyd
polyvinyl acetal and melamine-formaldehyde When the composition containing a thermosetting resin is employed as a nontransferable coating there may be included a suitable hardening agent or curing catalyst, the particular agent or catalyst being selected with regard to the resin employed; for example, with acid-curing thermosetting resins suitable curing catalysts are, for example, salts of chloracetic acid, ammonium salts, salts of beta brom hydrocinnamic acid, zinc chloride, and the like.

To avoid the drying out, cracking, or embrittlement of the nontransferable coating when the resin used is in the infusible state, there is preferably incorporated in the coating composition a nonvolatile plasticizer for the particular resin employed. For example, when using urea-formaldehyde resin, the plasticizer may comprise the diethyl or dibutyl esters of oxalic, tartaric, or phthalic acid, soft p-toluol sulphonamide resin, benzyl alcohol, borneol, glycol or glyceryl esters, acetanilide, soft alkyd resins, and the like. Other plasticizers may be selected for other particular resins by those skilled in the art. Also, optionally, dyes, pigments, anti-sticking agents, waxes, and other ingredients designed to impart other desirable properties to the coating may be added. Where the coated backing sheet is intended for reuse as a backing material, a waterproofing agent such as wax or an insoluble metallic soap may be advantageously incorporated in the coating.

In applying the coating composition to the backing sheet, the several ingredients of the coating are dissolved in a suitable volatile solvent to form a solution of the desired viscosity. Alternatively, the resin, together with the plasticizers and optional ingredients, may be heated until molten and applied in a molten condition to the backing sheet. Thereafter, the solvent is evaporated, or the coating is cooled, as the case may be, to render the coating dry and nontacky. During or after the drying of the coating, when a thermosetting resin in a thermoplastic state is used, the coated sheet material is subjected to heat to complete the polymerization of the resin to the insoluble, infusible, cured state, for example, by subjecting the coated sheet to an elevated temperature usually between 100° C. and 200° C. for about one hour or less. Enough coating is applied to leave a thin surface film of the desired thickness upon the backing sheet. A thickness of about 0.001″ is suitable, but as much as 0.002″ may be employed.

All of the thermosetting materials employed in the intermediate coating upon the backing sheet have certain functionally important group characteristics:

(a) They are all solids whose thermal softening points are higher than the thermal tacking point of the transfer film and preferably above 160° C. Preferably they are nonthermoplastic.

(b) Preferably they are thermosetting resin compositions in the nonthermoplastic insoluble stage.

(c) They are all film-forming-hydrophobic water-insoluble materials. The coating may or may not penetrate the backing sheet, but in either case, it forms an adhesive bond thereto which is stronger than the adhesive bond between it and the transfer film.

*The transfer film*

For the thermoplastic transfer film which is temporarily applied to the coated backing sheet, there may be used any thermoplastic hydrophobic film-forming material. By way of example, the thermoplastic material may comprise thermoplastic cellulose derivatives as a class, including the organic solvent-soluble cellulose esters such, for example, as cellulose acetate, cellulose butyrate, nitrocellulose, also alkyl-, carboxy-alkyl, and hydroxy-alkyl cellulose ethers of the types which are soluble in organic solvents, and the mixed ether-esters of cellulose; thermoplastic synthetic resins as a class, for example, polyvinyl resins such as polymers of vinyl acetate, vinyl chloride, styrene, after-chlorinated vinyl polymers, polyvinyl formal, acetal, and butyral, copolymers of vinyl chloride and vinyl acetate, copolymers of vinylidene chloride and vinyl chloride, copolymers of vinyl compounds and aldehydes, copolymers of vinyl halide and an acrylic acid derivative, and copolymers of vinyl acetate and styrene, coumarone-indene resins, polyethylene resins, acrylic resins such as polyesters of acrylic acid and methacrylic acid, polyamide resins such as those formed from dicarboxylic acids and diamines (nylon type); unsaturated polyester resins, thermoplastic synthetic elastomers as a class, such, for example, as polymerized butadiene, e. g. Buna rubber, olefine-polysulfides, e. g. "Thiokol," isobutylene polymers, e. g. "Vistanex," chloroprene polymers, e. g. "Neoprene," and highly plasticized polyvinyl halides, e. g. "Koroseal"; and also a mixture of any of the above thermoplastic resins.

It is also to be understood that thermosetting resins may be used in compatible admixture with thermoplastic resins. This permits the production of a transfer film which may be cured to a hard, infusible, nonthermoplastic state after transfer to another surface and prior or subsequent to stripping the backing sheet therefrom. Such thermosetting resins may include allyl, urea-aldehyde, phenol-aldehyde, alkyd, melamine-aldehyde, oil-modified alkyd, sulfonamide-aldehyde, and urea-aldehyde-alcohol ether resins. The transfer film may also comprise suitable plasticizers, moistureproofing agents, waterproofing agents, fireproofing agents, pigments, dyestuffs, and other materials as desired. In the transfer film the plasticizer may be either volatile or nonvolatile.

The transfer film may be applied to the backing film by any suitable means, for example, by dissolving the transfer film material in a volatile solvent which is a non-solvent for the backing film, applying the solution to the solvent, and evaporating the solvent at a temperature below the softening point of the backing film. Alternatively, the transfer film material may be melted and applied in a molten condition to the backing film whenever the softening point of the backing film is higher than the melting point of the transfer film material. Finally, the transfer film material may be softened by heating or by admixture with a solvent to form a plastic mass and which is then calendered on to the surface of the plastic backing film, after which the calendered film is cooled or the residual solvent evaporated.

Regardless of the method of applying the transfer film to the coating, it is apparent that a method must be selected which does not result in the permanent adhesion of the transfer film to the coating. Therefore, in preparing the composite transfer sheet it is necessary to take advantage of the dissimilarities in chemical or physical characteristics of the materials used in the coating and in the transfer film. Of course, if the coating and the transfer film materials differ in melting points, the film may be applied to the coating as a hot melt. Secondly, whether the transfer film and the coating have dissimilar solubilities, the transfer film composition is applied in a solvent which is a non-solvent for the coating.

On the other hand, it is entirely possible to make the coating and the transfer from chemically similar materials. For example, where they are both formed of a chemically similar resin, the resin used in the coating is prepared with a higher molecular weight than the resin used in the film, as a result of which the transfer film will be soluble in solvents in which the coating is not soluble and the film will have a lower melting point. Therefore, the resin used in the transfer film may be applied to the resin coating either (a) while dissolved in a non-solvent for the coating, or (b) melted and applied as a hot melt at a temperature below the softening point of the resin coating. Secondly, when the film and coating are chemically similar, the transfer film may contain a plasticizer which lowers its melting point, thus permitting the application of the film composition as a hot melt.

Finally, whether the coating and the film are chemically similar or dissimilar, the transfer film may be preformed and then applied to the coated backing sheet by light calendering without heat. For example, the transfer film is formed on a metal drum from which it is transferred under light pressure to the coated backing sheet.

It is thus seen that the present invention permits the widest variation in the nature and composition of the backing sheet coating and the transfer film, only two conditions being necessary; (1) that the thermal tacking point of the transfer film be lower than the thermal softening point of the coating upon the backing sheet, and (2) that the nontransferable coating on the backing sheet and the transfer film be immiscible with each other under the conditions of transfer so that they exhibit no substantial tendency for permanent adhesion to each other.

In Figure 1 there is shown suitable means for producing the composite transfer sheeting of the invention. The backing sheet 10 is unrolled from the roll 11 and passed under a spray 12 of a thermosetting material in a thermoplastic state such as a thermoplastic urea-formaldehyde resin. The spray is produced by a spray gun 13 of conventional design. To render the sprayed coating uniform in thickness, the material is preferably fluxed by passing it in contact with a roll 14 heated to a temperature above the softening point of the sprayed coating. The coated backing sheet is then heated at a temperature which will complete the polymerization of the thermosetting resin to an infusible nonthermoplastic state. This temperature may be between 100° C. and 160° C. The time required for completing the polymerization reaction may be reduced by the addition of a latent curing catalyst to the resin composition. On the nontransferable coating thus produced upon the backing sheet, there is applied a thermoplastic transfer film. This may be done, for example, as shown in the drawing by passing the coated sheet over a supporting roll 16 and under a hopper 17 containing the film-forming composition in flowable condition, by means of which a thin continuous film is applied to the coated backing sheet. The film thus formed is cooled, or if solvents are present, warmed in a hardening chamber 18 until dry, after which the composite transfer film may be wound in the roll 19.

One embodiment of a composite transfer sheet produced according to the present invention is shown in Figure 2. The transfer sheet comprises a backing sheet 20 and an intermediate thermoset coating 21 and the transfer film 22 disposed over the intermediate coating. It is to be understood that the backing sheet 20 may be coated on both sides with an intermediate thermostat nontransferable coating and provided on each side with a transfer film 22. The double transfer sheet thus produced may be utilized for coating two surfaces simultaneously or in sequence. The transfer film may be a continuous film coextensive with the area of the coated backing sheet, or it may occupy only predetermined areas thereon. The transfer film preferably has a thickness of from 0.0005″ to 0.002″ and is normally not self-supporting.

The transferring operation

The operation by which the transfer film is transferred to the surface to be coated may be effected by heated platens, calender rolls, or drums. In general, the transfer films of the present invention may be transferred at temperatures between 100° C. and 160° C. The pressures employed during transfer should be sufficient to cause permanent adhesion of the transfer film to the surface being coated but should not be sufficient to cause too great a penetration of the film into the surface for this will normally result in rupture of the film. Pressures between 100 and 450 pounds per square inch are usually sufficient. In coating open mesh fabrics, one may use pressures as low as 5 pounds per square inch. The laminate thus produced is preferably cooled so that the transfer film is nontacky and the coated backing sheet then stripped off. This will, of course, necessitate stripping at a point spaced from the point of transfer. After stripping, the transfer film may be polished, decorated, embossed, coated, or otherwise treated as desired.

In Figure 3 there is shown one embodiment of suitable means for using the transfer sheet produced in accordance with this invention. The composite sheet 23 and the flexible sheet material 24 to be coated are passed between assembly rolls 25 which permit inspection and removal of wrinkles and then between the heated calender rolls 26 which are heated to a temperature sufficient to render the transfer film 22 tacky. Sufficient pressure is exerted by the rolls to adhere the transfer film firmly to the flexible sheet material 24 being coated. Thereafter the assembled sheet materials or laminate so produced are passed through a cooling zone provided by the chamber 27 in which the temperature of the laminate is caused to drop so that the transfer film is no longer tacky. The coated backing sheet 20 is then stripped from the laminate by means of the stripping roll 28. The coating upon the backing sheet adheres to the backing sheet and strips cleanly from the transfer film. Thereafter, if desired, the sheet material 24 carrying the transfer film 22 may be passed over a polishing roll 29 which renders the surface of the transfer film smooth and glossy, after which the coated sheet material may be rolled up into the roll 30.

In Figure 4 there is shown a cross section of the assembled sheet materials or laminate at the point of stripping, that is, as the coated backing sheet is passed over the stripping roll 28 in the apparatus of Figure 3. The assembled sheets comprise the stripping or backing sheet 20, the intermediate nontransferable thermoset coating 21, the transfer film 22, and the sheet 24 being coated. It will be found on stripping that the intermediate coating 21 adheres to the backing sheet 20 and strips cleanly from the transfer film 22.

It is to be understood that the stripping of the backing sheet may take place immediately after transfer. Thus, the chamber 27 may be omitted in the apparatus shown in Figure 3, and the lower calender roll 26' may also serve as the stripping roll. Better control and superior results are obtained, however, if the stripping takes place at a distance from the point of application of heat and pressure after the transfer film has been rendered nontacky by cooling.

The practice of this invention is illustrated by the following examples:

EXAMPLE I

A smooth calendered kraft paper was coated on one side with a solution comprising 10 parts of a urea-formaldehyde butanol ether resin in the thermoplastic stage, 3 parts of a soft alkyd resin as a plasticizer, and .05 parts of ammonium sulfate as a catalyst, all dissolved in 87 parts of butyl alcohol. The coated paper was then heated at approximately 125° C. for a sufficient time to complete the polymerization of the urea-formaldehyde resin which rendered the film infusible and nontacky. The backing sheet was thereby provided with a hard nonthermoplastic coating insoluble in organic solvents. The coated backing sheet was then coated with a film-forming composition comprising 10 parts of a composition containing 9 parts of the copolymer of vinyl chloride and vinyl acetate, 1 part methyl methacrylate resin, 0.15 parts tricresyl phosphate, 0.15 parts methyl cellosolve acetyl ricinoleate, all dissolved in 89.7 parts ethylene dichloride. Since the urea-formaldehyde coating was insoluble in the solvent used for the transfer film, it was not affected by this coating step. The coated sheet was again dried and then heated slightly to render the transfer film tacky. In this state it was pressed, transfer film down, on a printed paper at a temperature of approximately 154° C. and a pressure of 450 pounds per square inch for 30 seconds. The laminate was cooled to render the transfer film nontacky and the backing sheet then stripped from the composite laminate. The resulting coated paper had a dull uneven surface which was glazed by pressing against a polished metal roller. The backing sheet was found to strip cleanly from the transfer film with none of the urea-formaldehyde coating adhering to the transfer film and substantially none of the transfer film adhering to the urea-formaldehyde coating.

EXAMPLE II

A sheet of highly calendered asbestos paper was coated on one side with polymerized vinylidene chloride, the resin being applied in the molten condition and spread to form a smooth continuous film on the surface of the paper, after which the resin was cooled. The coated product was then coated with a solution comprising 12 parts of cellulose nitrate, one part of dibutyl phthalate dissolved in a mixture of butyl alcohol and ethyl acetate, and the solvent evaporated to form a film having a thickness of about 0.001 inch.

EXAMPLE III

A sheet of regenerated cellulose plasticized with glycerine was coated on one side with a solution comprising 10 parts of thermoplastic maleic-modified phthalic-glyceride resin and 0.1 part of a curing catalyst dissolved in 90 parts of toluene, and the solvent evaporated. The coated sheet was then heated at 100° C. in a humid atmosphere in order to complete the polymerization of the alkyd resin to an infusible nonthermoplastic state in which the alkyd resin coating was not affected by organic solvents. The coated sheet was then coated with a solution comprising 10 parts of ethyl cellulose dissolved in a mixture of ethyl alcohol and acetone after which the solvent was evaporated to leave a thin continuous transfer film on top of the alkyd resin coating. The transfer film was pressed against a textile fabric at a temperature of 130° C. and a pressure of 300 pounds per square inch. The laminate was then cooled until the transfer film was nontacky and the backing sheet and its nontransferable alkyd resin coating stripped from the transfer film. The transfer film was found to strip from the alkyd resin coating without delamination from the regenerated cellulose or without the alkyd resin coating delaminating from the backing sheet.

EXAMPLE IV

A closely woven cloth was coated on one side with a solution of 15 parts of cellulose acetate in acetone, a plurality of coatings being applied until there is formed a smooth continuous coating over the yarns of the fabric. On this coating there is calendered a plastic mass comprising polyisobutylene rendered plastic by admixture of a lower polymer of the same substance. The polyisobutylene transfer film thus formed was found to strip cleanly from the cellulose acetate after applying the transfer film to another surface by heat and pressure. Since the cellulose acetate has a softening point much higher than the softening point of the polyisobutylene, it was found possible to render the polyisobutylene film tacky without rendering the cellulose acetate coating tacky.

EXAMPLE V

A sheet of highly calendered paper was coated on one side with a composition comprising 12 parts of a phenol-formaldehyde resin, two parts of a soft alkyd resin as a plasticizer, and .05 parts of phthalic acid as a curing catalyst, all dissolved in a mixture of toluene. After evaporation of the solvent, the coated sheet was heated at 125° C. to complete the polymerization of the resin and convert the coating to the insoluble nonthermoplastic condition. On the resin coating thus formed there was applied a solution comprising 50 parts of polyvinyl butyral, 10 parts of a phenol-formaldehyde resin in the thermoplastic state and two parts of dibutyl phthalate, all dissolved in a mixture of butyl alcohol and acetone. Pigments were added to the solution to impart an olive drab color to the coating. The solution was adjusted to the desired viscosity and then coated upon the coated backing sheet. The solvent was removed by gentle heating at a temperature below 100° C. The dried preformed transfer film was heated until tacky and then applied to nylon cloth having 120 x 82 threads to the inch comprising 40 and 60 denier continuous yarn in the warp and in the weft, respectively. The laminate was cooled and the backing sheet then stripped from the transfer film. The film was found to adhere firmly to the nylon cloth while stripping easily and cleanly from the phenol-formaldehyde coating upon the backing sheet. The coated nylon cloth was then heated at a temperature between 110° C. and 130° C. in order to complete the polymerization of the phenol-formaldehyde resin present in the transfer film. This rendered the film infusible, hard, and nonthermoplastic. Despite the thickness of the film, it was continuous and impervious to moisture and gases. It was found satisfactory when used in the manufacture of raincoats, tents, and other protective articles.

EXAMPLE VI

The process of the above example was repeated except that the transfer film coated upon the nylon cloth was heated at a temperature between 110° C. and 150° C. prior to stripping the coated backing sheet therefrom until polymerization of the phenol-formaldehyde resin was complete and a hard nonthermoplastic coating obtained.

Various rough-shaped articles may be uniformly and completely coated with smooth, glossy plastic films by using the transfer sheet of the present invention. It is best with the present sheet to simultaneously emboss a crimp or otherwise deform the transfer sheet and/or a sheet material being coated during the transferring operation or after the transferring operation. Thus, transfer coating is extended by use of the present sheet to applications which were not capable of being satisfactorily performed with paper-supported transfer films of the prior type. Alternatively, a rough-surfaced material, such as embossed paper, open mesh fabric, pebbled or tooled leather, and rippled shingles and the like, may be coated by use of the transfer sheet of the present invention. When the article to be coated is very rough or has projections thereon, the calendered roll which bears upon the surface of the plastic backing film may be covered with a resilient surface, for example, it may be wrapped with several layers of fabric or coated with a layer of rubber, cork, sponge, etc. in order to provide a yielding surface during the pressing of the plastic film over the projections.

This application is a continuation-in-part of my prior application for United States Letters Patent Serial No. 454,066 filed August 7, 1942 now abandoned. In this prior application, there is disclosed a process of transfer coating wherein a thermoplastic material is interposed between the material being coated and the transfer film. The backing sheet of the present application may be employed in the process of my prior application and in addition has other uses, many of which have been enumerated above.

Having described my invention, what I claim as new and desire to secure by Letters Patent is:

1. A process of coating comprising applying a flexible thermoplastic resin coating to a flexible support comprising a flexible paper sheet carrying on the side to be coated, a flexible coating consisting essentially of a thermosetting resin in the infusible state and an amount of plasticizer sufficient to render the resin flexible, bringing a flexible sheet material to be coated into contact with the said flexible thermoplastic resin coating, heating said assembled materials to adhere said flexible thermoplastic resin coating to said flexible sheet material and thereafter separating said temporary flexible support from said coated sheet material.

2. A flexible transfer sheet comprising a flexible paper sheet carrying a permanent coating consisting essentially of a thermosetting resin in the infusible state and an amount of a plasticizer sufficient to render the resin flexible, a flexible temporary coating comprising a thermoplastic coating on said permanent coating, said temporary coating readily separating from the said permanent coating after adhesion of the temporary coating to another material.

3. A flexible transfer sheet comprising a flexible paper sheet carrying a permanent coating consisting essentially of a urea-formaldehyde resin in the infusible state and an amount of a plasticizer sufficient to render the resin flexible, a flexible temporary coating comprising a vinyl resin coating on said permanent coating, said temporary coating readily separating from said permanent coating after adhesion of the temporary coating to another material.

4. A flexible transfer sheet comprising a flexible paper sheet carrying a permanent coating consisting essentially of a phenol-formaldehyde resin in the infusible state and an amount of a plasticizer sufficient to render the resin flexible, a flexible temporary coating comprising a vinyl resin coating on said permanent coating, said temporary coating readily separating from said permanent coating after adhesion of the temporary coating to another material.

5. A flexible transfer sheet comprising a flexible paper sheet carrying a permanent coating consisting essentially of a thermosetting resin in the infusible state and an amount of a plasticizer sufficient to render the resin flexible, a flexible temporary coating comprising polyvinyl butyral and phenol-formaldehyde resin in a thermoplastic state on said permanent coating, said temporary coating readily separating from the said permanent coating after adhesion of the temporary coating to another material.

CARLETON S. FRANCIS, Jr.

REFERENCES CITED

The following references are of record in the file of this patent:

UNITED STATES PATENTS

| Number | Name | Date |
|---|---|---|
| 1,981,472 | Schneider | Nov. 20, 1934 |
| 2,062,088 | Dreyer | Nov. 24, 1936 |
| 2,154,198 | Carr et al. | Apr. 11, 1939 |
| 2,191,957 | Edgar et al. | Feb. 27, 1940 |
| 2,209,530 | Mason | July 30, 1940 |
| 2,303,826 | Bell | Dec. 1, 1942 |
| 2,311,489 | Toland | Feb. 16, 1943 |
| 2,320,473 | Rooney | June 1, 1943 |
| 2,403,077 | Hershberger | July 2, 1946 |
| 2,423,565 | Rodman | July 8, 1947 |